(12) United States Patent
Filart

(10) Patent No.: US 10,863,025 B2
(45) Date of Patent: Dec. 8, 2020

(54) EFFICIENT ROBOCALL/SCAM IDENTIFICATION WITH VERIFICATION FUNCTION

(71) Applicant: T-Mobile USA, Inc., Bellevue, WA (US)

(72) Inventor: Homer Nicolas B. Filart, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 232 days.

(21) Appl. No.: 15/605,784

(22) Filed: May 25, 2017

(65) Prior Publication Data
US 2018/0343343 A1    Nov. 29, 2018

(51) Int. Cl.
*H04L 29/06* (2006.01)
*H04L 29/12* (2006.01)
(Continued)

(52) U.S. Cl.
CPC .......... *H04M 3/436* (2013.01); *H04L 61/157* (2013.01); *H04L 65/102* (2013.01);
(Continued)

(58) Field of Classification Search
CPC . H04L 61/157; H04L 65/1006; H04L 65/102; H04L 65/1063; H04L 61/106;
(Continued)

(56) References Cited

U.S. PATENT DOCUMENTS

| 2002/0137490 A1* | 9/2002 | Gallant ............... G06Q 20/102 455/411 |
| 2006/0018311 A1 | 1/2006 | Kobayashi et al. |

(Continued)

FOREIGN PATENT DOCUMENTS

| KR | 1020080009207 | 1/2008 |
| WO | WO2011133135 A1 | 10/2011 |

OTHER PUBLICATIONS

The PCT Search Report and Written Opinion dated Aug. 29, 2018, for PCT Application No. PCT/US18/31860, 14 pages.
(Continued)

*Primary Examiner* — Mark H Rinehart
*Assistant Examiner* — Natali Pascual Peguero
(74) *Attorney, Agent, or Firm* — Lee & Hayes, P.C.

(57) ABSTRACT

Systems and methods for classifying and routing an inbound call using ENUM queries are described. When a calling party initiates an inbound call, an Interconnect Session Border Controller (I-SBC) may generates a query for a calling party number (CgPN) and a called party number (CdPN) to search CgPN information and personal number block (PNB) information in a first E.164 Number to URI Mapping (ENUM) database. If the I-SBC is able to check the CgPN using the first ENUM database, the I-SBC may set a parameter of the inbound call to a first status to avoid further checking. Otherwise, the I-SBC may set the parameter to a second status, and the inbound call, tagged with a service provider identification (SPID) number associated with the classification found in one or more of the ENUM databases, is processed based on the SPID.

20 Claims, 6 Drawing Sheets

(51) Int. Cl.
*H04W 12/12* (2009.01)
*H04M 3/436* (2006.01)
*H04M 7/00* (2006.01)
*H04M 3/42* (2006.01)

(52) U.S. Cl.
CPC ...... *H04L 65/1006* (2013.01); *H04L 65/1063* (2013.01); *H04W 12/1206* (2019.01); *H04L 61/106* (2013.01); *H04L 61/1511* (2013.01); *H04M 3/42042* (2013.01); *H04M 3/42059* (2013.01); *H04M 7/0075* (2013.01)

(58) Field of Classification Search
CPC .............. H04L 61/1511; H04M 3/436; H04M 3/42042; H04M 3/42059; H04M 7/0075; H04W 12/12
USPC .................................................. 370/254, 259
See application file for complete search history.

(56) References Cited

U.S. PATENT DOCUMENTS

| | | | |
|---|---|---|---|
| 2007/0041526 A1 | 2/2007 | Hill et al. | |
| 2007/0133574 A1 | 6/2007 | Tejani et al. | |
| 2007/0206747 A1 | 9/2007 | Gruchala et al. | |
| 2008/0019356 A1* | 1/2008 | Marsico ............ | H04L 29/12132 370/352 |
| 2009/0285204 A1 | 11/2009 | Gallant et al. | |
| 2010/0034121 A1 | 2/2010 | Bozionek | |
| 2010/0046726 A1* | 2/2010 | Yang ................. | H04M 3/42042 379/142.04 |
| 2011/0098049 A1 | 4/2011 | Gosnell et al. | |
| 2012/0237014 A1* | 9/2012 | Gregorat ............ | H04L 29/1216 379/220.01 |
| 2012/0307993 A1 | 12/2012 | Masters | |
| 2013/0287196 A1 | 10/2013 | Zerillo | |
| 2016/0269522 A1 | 9/2016 | Wen et al. | |
| 2017/0171251 A1 | 6/2017 | Ku et al. | |
| 2018/0063333 A1 | 3/2018 | Kondakjian et al. | |

OTHER PUBLICATIONS

Office action for U.S. Appl. No. 15/384,185, dated Jun. 14, 2018, Kondakjian, "Call Classification and Routing Using ENUM Queries", 40 pages.

The PCT Search Report and Written Opinion dated Nov. 20, 2017 for PCT application No. PCT/US2017/046966, 25 pages.

Faltstrom, "E.164 number and DNS," available at <<https://www.ietf.org/rfc/rfc2916.txt>> Network Working Group, Sep. 2000, 10 pages.

Final Office Action dated Dec. 4, 2018 for U.S. Appl. No. 15/384,185 "Call Classification and Routing Using ENUM Queries" Kondakjian, 49 pages.

Office Action for U.S. Appl. No. 15/384,185, dated Apr. 18, 2019, Kondakjian, "Call Classification and Outing Using ENUM Queries", 55 pages.

The Extended European Search Report dated Dec. 2, 2019 for European Patent Application No. 17847201.5, 7 pages.

Office action for U.S. Appl. No. 15/384,185, dated Sep. 12, 2019, Kondakjian et al., "Call Classification and Routing Using ENUM Queries", 57 pages.

European Office Action dated Sep. 1, 2020 for European Patent Application No. 178472015, a counterpart of U.S. Appl. No. 15/384,185, 4 pages.

Extended European Search Report dated Sep. 3, 2020 for European Patent Application No. 18806901.7, 7 pages.

Non Final Office Action dated Feb. 5, 2020 for U.S. Appl. No. 15/384,185 "Call Classification and Routing Using Enum Queries" Kondakjian, 61 pages.

* cited by examiner

200

116

| SPID Field 202 | CgPN Field 204 |
|---|---|
| 1111<br>Possible Spam<br>206 | (800) 987-6534<br>(800) 987-6533<br>(800) 987-6532<br>(800) 987-6531<br>...  216 |
| 2222<br>Possible Fraud<br>208 | (555) 123-4567<br>(877) 111-1235<br>(899) 453-8795<br>...  218 |
| 3333<br>Known Market Research<br>210 | (899) 999-8888<br>(555) 789-5555<br>(877) 858-4747<br>...  220 |
| 9999<br>Known Spam<br>212 | (877) 345-7726<br>(800) 741-2589<br>(899) 369-8521<br>...  222 |
| 6529<br>Normal<br>214 | |

FIG. 2

EFFICIENT ROBOCALL/SCAM IDENTIFICATION WITH VERIFICATION FUNCTION

BACKGROUND

Modern telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. The 5G telecommunication technologies are the next generation mobile networks that are designed to combine both an evolution and revolution of the existing LTE/LTE-A mobile networks to provide a much higher connectivity, greater throughput, much lower latency, and ultra-high reliability to support new use cases and applications. Some of mobile devices operating in such telecommunication systems are also capable of operating over Wi-Fi networks for voice, also known as Voice-over-IP (VoIP) and data.

A user of such a mobile device may occasionally receive a call from an unknown caller, which may turn out to be an unwanted call such as a sales, telemarketing, robocall, spam, and the like. Even if the user had subscribed to a call ID service, seeing an unknown telephone number does not help the user to (consciously, effectively, knowingly, purposely, intentionally) decide to answer or dismiss the call. The user may be able to create his own list of blocked numbers, however, he would still need to initially answer the unknown call to decide whether to add the unknown number to the blocked number list to avoid future calls.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates an example ENUM database.

DETAILED DESCRIPTION

Figure 1:
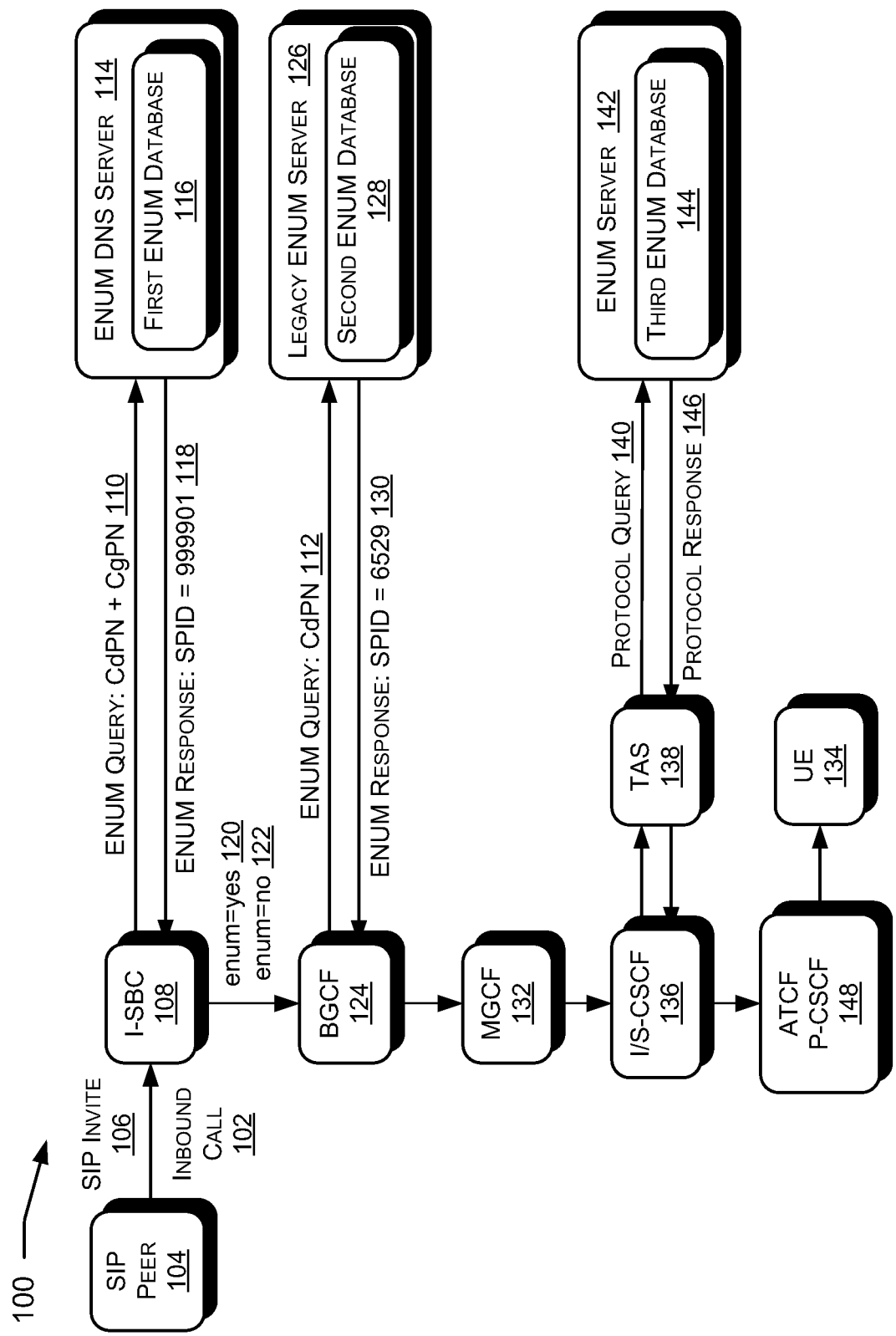
FIG. 1 illustrates an example block diagram of a system for classifying and routing an inbound call using ENUM queries and a status verification parameter.

Systems and methods discussed herein are directed to a service provided by a network for subscribers of the network for receiving additional information regarding incoming calls. Examples may include a system and a method for classifying and routing an inbound call using E.164 Number to URI Mapping (ENUM) queries, and identifying an inbound call that has already been classified to improve network efficiency by avoiding subsequent classification processes.

When a calling party initiates an inbound call, such as a voice over Internet Protocol (VoIP) call, the Session Initiation Protocol (SIP) may be utilized and an INVITE message may be routed from a SIP Peer to an Interconnect Session Border Controller (I-SBC). The INVITE message may include inbound call information such as a Calling Party Number (CgPN) and Called Party Number (CdPN) which may be telephone numbers and/or addresses in the Domain Name System (DNS). The I-SBC may then generate a query for the CgPN and CdPN to search the inbound call in an E.164 Number to URI Mapping (ENUM) database. The ENUM database may maintain various classifications, such as normal, spam, sale, marketing, scam, and the like, for phone numbers, E.164 addresses, and/or DNS addresses. There may be a plurality of ENUM databases utilized at various stages of call processing. Each ENUM database may be maintained by a third party whose service is to collect information about known/suspected phone numbers for spam, scam, marketing, sales, etc., and compile the information. The user may provide a feedback to third party or to the ENUM databases to enhance the classification of the received call, for example, a new, previously unidentified spam call.

The I-SBC may check the query against the ENUM database and identify a service provider identification (SPID) number associated with the classification of the CgPN found in the ENUM database. The ENUM database may also maintain information regarding the classification of the CdPN to identify whether the CdPN is a subscriber of the network and preferences of each subscriber of the network. The I-SBC may tag the SPID and an associated predetermined description to the inbound call, and route the inbound call based on the SPID. Depending on the SPID, the I-SBC may forward the inbound call to a called party of the inbound call without any revision, a normal call for example, or with a notice that the inbound call may be a spam. The I-SBC may block the inbound call for the inbound call identified as a known spam.

Additionally, the I-SBC may assign the inbound call a status verification parameter set to a first or second status, enum=yes or enum=no, in the INVITE message of the inbound call. The status verification parameter functions as an indicator regarding whether the query for the inbound call has been evaluated against the ENUM database at this stage, i.e. at the I-SBC, of call processing. Based on a subscription policy and/or a call-originating network type associated with the inbound call, the query for the inbound call may be routed to an ENUM DNS server, where the ENUM database is maintained, and may be evaluated for various call classifications as noted above, personal number block (PNB), and transit check. The transit check may be performed to verify that the inbound call is destined for a network subscriber. If the inbound call is determined not to be destined to a network subscriber, the inbound call may be identified as a transit call and rejected with a SIP error code such as 403 Forbidden or 603 Decline code. The inbound call having the query routed to the ENUM DNS server may receive the status verification parameter set to enum=yes, indicating that the inbound call need not be further evaluated. However, the inbound call not meeting certain characteristics may not have the query routed to the ENUM DNS server for a call evaluation at this stage, and may receive the status verification parameter set to enum=no. Regardless of the enum status, the call may then be forwarded to a border gateway control function (BGCF). The query for the inbound call with enum=no may then be routed to a legacy ENUM server for a transit check, and another query may be generated and evaluated with a third ENUM server for the PNB and classification. Because all the evaluations have already been performed at the ENUM DNS server for the enum=yes inbound call, the enum=yes inbound call need not have the query routed to additional servers. When the inbound call reaches the end user device (a receiving party), a notification with the classification of the caller/phone number is provided to the end user to assist in deciding whether to accept the call. The end user may choose not receive all calls belonging to a certain classification.

FIG. 1 illustrates an example block diagram 100 of a system for classifying and routing an inbound call using ENUM queries and a status verification parameter. As a calling party initiates a call, such as an inbound call 102, a SIP Peer 104 may send a SIP INVITE 106 to an I-SBC 108, where an inbound session agent (not shown) may cause the I-SBC 108 to generate an ENUM query. The ENUM query may be based on a subscription policy and/or a call-originating network type associated with the inbound call 102, and may comprise a CdPN query and CgPN query which may be concatenated into one query, such as an ENUM query 110, or the CdPN query only, such as an ENUM query 112. The I-SBC 108 may evaluate the CdPN query to determine if the called party were a subscriber to a service for classifying and routing an inbound call using ENUM queries before determining whether to generate an ENUM response.

Based on the subscription policy and/or a call-originating network type associated with the inbound call 102, the I-SBC 108 may route the ENUM query 110 with the CdPN and CgPN queries to a first ENUM server, such as an ENUM DNS Server 114, where a first ENUM database 116 may be maintained, and may, in response, generate an ENUM response 118 with a service provider identification (SPID) number, for example, SPID=999901, which may indicate that the inbound call 102 is a known SPAM.

The I-SBC 108 may assign the inbound call 102 a status verification parameter set to a first status of enum=yes 120 or a second status of enum=no 122 in the INVITE message 106 of the inbound call 102 based on whether the ENUM query has been evaluated. For example, if the I-SBC 108 generates the ENUM query 110, and routes it to the ENUM DNS server 114 for evaluation, then the I-SBC 108 assigns enum=yes 120 to the status verification parameter indicating that no further query evaluation is required for the inbound call 102. However, if the I-SBC 108 generates the ENUM query 112 which has not been routed to the ENUM DNS server 114 for evaluation, then the I-SBC 108 assigns enum=no 122 to the status verification parameter indicating that further query evaluation is required for the inbound call 102. The status verification parameter may be added in a request uniform resource identifier (R-URI) in a SIP INVITE header field of the inbound call 102.

The I-SBC 108 may then forward the inbound call 102, having the status verification parameter assigned, to a border gateway control function (BGCF) module 124. If the inbound call 102 has the status verification parameter set to enum=no 122, then the BGCF module 124 may route the ENUM query 112 to another ENUM server, such as a legacy ENUM server 126, where a second ENUM database 128 is maintained. The BGCF module 124 may generate an ENUM response 130 with an SPID number, for example, SPID=6529, which may indicate that the inbound call 102 is a normal call.

The BGCF module 124 may then forward the inbound call 102 to a media gateway control function (MGCF) module 132, which may perform a send routing information (SRI) request and identify the call termination, a user equipment (UE) 134, as an Internet Protocol (IP) Multimedia Subsystem (IMS) terminal. The MGCF module 132 may relay the status verification parameter, set to either enum=yes 120 or enum=no 122, along with the inbound call 102, to an such as an interrogating/serving call session control function (I/S-CSCF) module 136.

The I/S-CSCF module 136 may then relay the status verification parameter of the inbound call 102 to a telephony application server (TAS) 138. The TAS 138 may verify the presence of the status verification parameter of the inbound call 102, and if it is set to enum=yes 120, then TAS 138 takes no further action. However, if the status verification parameter is set to enum=no 122, then the TAS 138 may generate a protocol query 140, which may be a representational state transfer (REST), ENUM, or any other protocol related query. The TAS 138 may then check the protocol query 140 with a third server, such as a third ENUM server 142, having a third database, such as a third ENUM database 144, which may be maintained by a third party. The protocol query 140 may include a check for a PNB and SPAM. The TAS 138 may then receive a protocol response 146 in response to the protocol query 140 from the third ENUM server 142, and may relay a revised SPID based on the protocol response 146 to the I/S-CSCF 136.

The I/S-CSCF 136 may then forward the inbound call with the SPID, which may have been updated by the TAS 138 if the status verification parameter were set to enum=no, to an access transfer control function (ATCF) proxy call session control function (P-CSCF) module 148, which may forward the inbound call to the UE 134.

FIG. 2 illustrates an example embodiment 200 of the ENUM database 116. The ENUM database 116 is also used to illustrate the ENUM database 128 and 144 which may be similar to the ENUM database 116. The ENUM database 116 may comprise an SPID field 202 and a CgPN field 204. Instead of valid SPIDs associated with normal calls, the SPID field 202 lists a plurality of fake SPIDs corresponding various categories, such as 1111 for possible SPAM 206, 2222 for possible fraud 208, 3333 for known market research 210, 9999 for known SPAM 212, and the like. Under each SPID, associated CgPN information may be listed. The CgPN information may include phone numbers, E.164 addresses, SIP address, or results from a DNS look-up based on the E.164 entries. In this example, four sets of 10- or 11-digit phone numbers, possible SPAM numbers 216, possible fraud numbers 218, known market research numbers 220, and known SPAM numbers 222 are illustrated. The ENUM database 116 may maintain CdPN subscription-based information such as a PNB and CgPN information of undesired nature. If the CgPN information of the inbound call 102 were not found in the ENUM database 116, the inbound call 102 may be considered normal, following a verification of the CdPN as a subscriber of the network, and be assigned a specific SPID, such as 6529 for normal call 214 for example, indicating the inbound call 102 is a normal call. Each SPID may be associated with a predefined call routing process. For example, a call with the SPID=9999 may be automatically rejected because it is a known SPAM, and a call with the SPID=6529 may be routed to the intended destination without further evaluation because it is determined to be a normal call.

The ENUM databases 116, 128, and 144 may be maintained and updated by a third party, and may accept feedback from users. A reporting solution may be utilized to track numbers of blocked and/or tagged calls, reasons for blocking certain calls or phone numbers, frequency of calls from the same calling party, and the like. Such reports may be sent via email to the third party maintaining the ENUM databases 116, 128, and 144, and to a network carrier employing the ENUM databases 116, 128, and 144. Based on the report, the ENUM databases 116, 128, and 144 may be updated near real-time. The ENUM database 116, 128, and 144 may also be supplemented by obtaining similar listings and classifications of phone numbers offered by services other than the third party.

Referring back to FIG. 1, if the inbound call 102 were from (877) 345-7726, the I-SBC 108 would generate the ENUM query 110 including this number, search for this number in the ENUM database 116, find it in the known SPAM numbers 222, and return the ENUM response 118 with the SPID of 9999 from the Known SPAM 212 as described in FIG. 2. Alternatively, the SIP INVITE 106 may be sent to an analytics engine associated with the ENUM database 116 for a pattern matching and/or recognition for the inbound call 102, and a result may be used to update the ENUM database 116. The inbound call 102 may be routed according to a predefined process associated with the SPID.

At the I-SBC 108, a session agent (SA) may route the inbound call 102 based on the SPID provided in the ENUM response 118 specific to the SPID. For example, a known SPAM call may be automatically rejected or generate an automatic response to the caller indicating the called party is unavailable. The SA may apply a header manipulation rule (HMR) to add a description associated with the SPID to the inbound call 102. The added description may be visible at the called party of the inbound call 102, and may provide a notice or warning regarding the nature of the inbound call 102.

Figure 3:
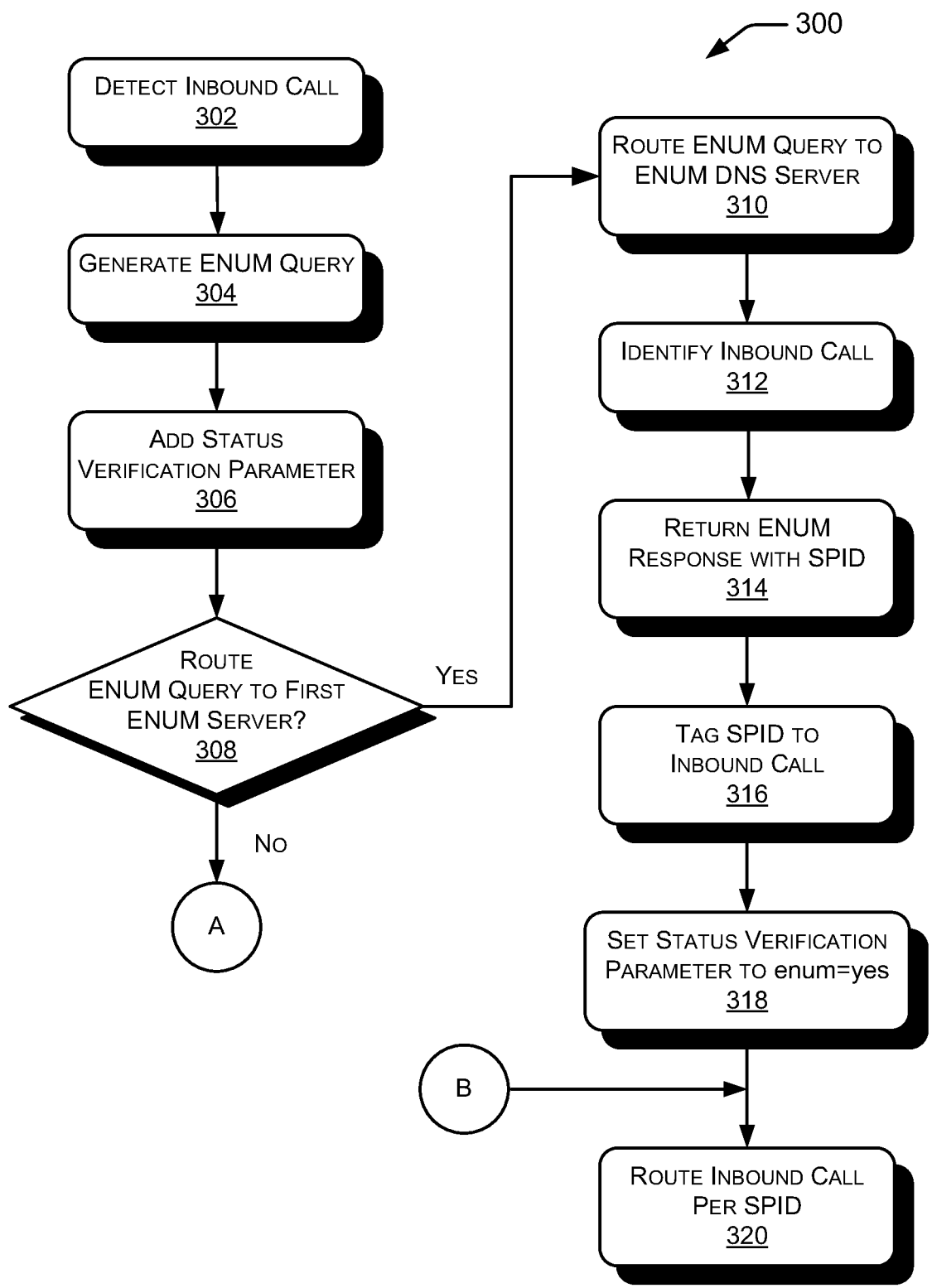
FIG. 3 illustrates an example process for classifying and routing an inbound call using ENUM queries a status verification parameter.

FIG. 3 illustrates an example process 300 for classifying and routing an inbound call using ENUM queries a status verification parameter. In block 302, an inbound call, such as the inbound call 102 as discussed above with reference to FIG. 1, may be detected as a result of the SIP Peer 104 sending the SIP INVITE 106 to the I-SBC 108. In response to detecting the in inbound call 102, an ENUM query may be generated in block 304. As discussed above with reference to FIG. 1, the ENUM query may be based on a subscription policy and/or a call-originating network type associated with the inbound call 102, and may comprise a CdPN query and CgPN query which may be concatenated into one query, such as an ENUM query 110, or the CdPN query only, such as an ENUM query 112. In block 306, the I-SBC 108 may add a status verification parameter to the SIP INVITE 106 of the inbound call 102. The status verification parameter may be added to a request uniform resource identifier (R-URI) in a SIP INVITE header field of the inbound call 102 or in any other SIP headers.

In block 308, based on the subscription policy, and/or the call-originating network type associated with the inbound call 102, or the generated ENUM query, the I-SBC 108 may determine to route the ENUM query to a the ENUM DNS Server 114, where the first ENUM database 116 may be maintained. The I-SBC 108 may route the ENUM query 110 to the ENUM DNS Server 114 in block 310, identify the inbound call 102 based on the ENUM query 110 and the first ENUM database 116 in block 312, and return an ENUM response with an SPID, such as the ENUM response 118, for the inbound call 102 in block 314. The SPID may then be tagged to the inbound call 102 in block 316, and the status verification parameter is set to enum=yes in block 318, indicating that the inbound call 102 requires no further queries and evaluations. The inbound call 102 may then be routed according to a predefined process associated with the SPID in block 320 as discussed above. For example, the inbound call 102 may not be routed to the UE 134 or a response indicative of the called party being unavailable or busy may be sent back to the calling party.

Figure 4:
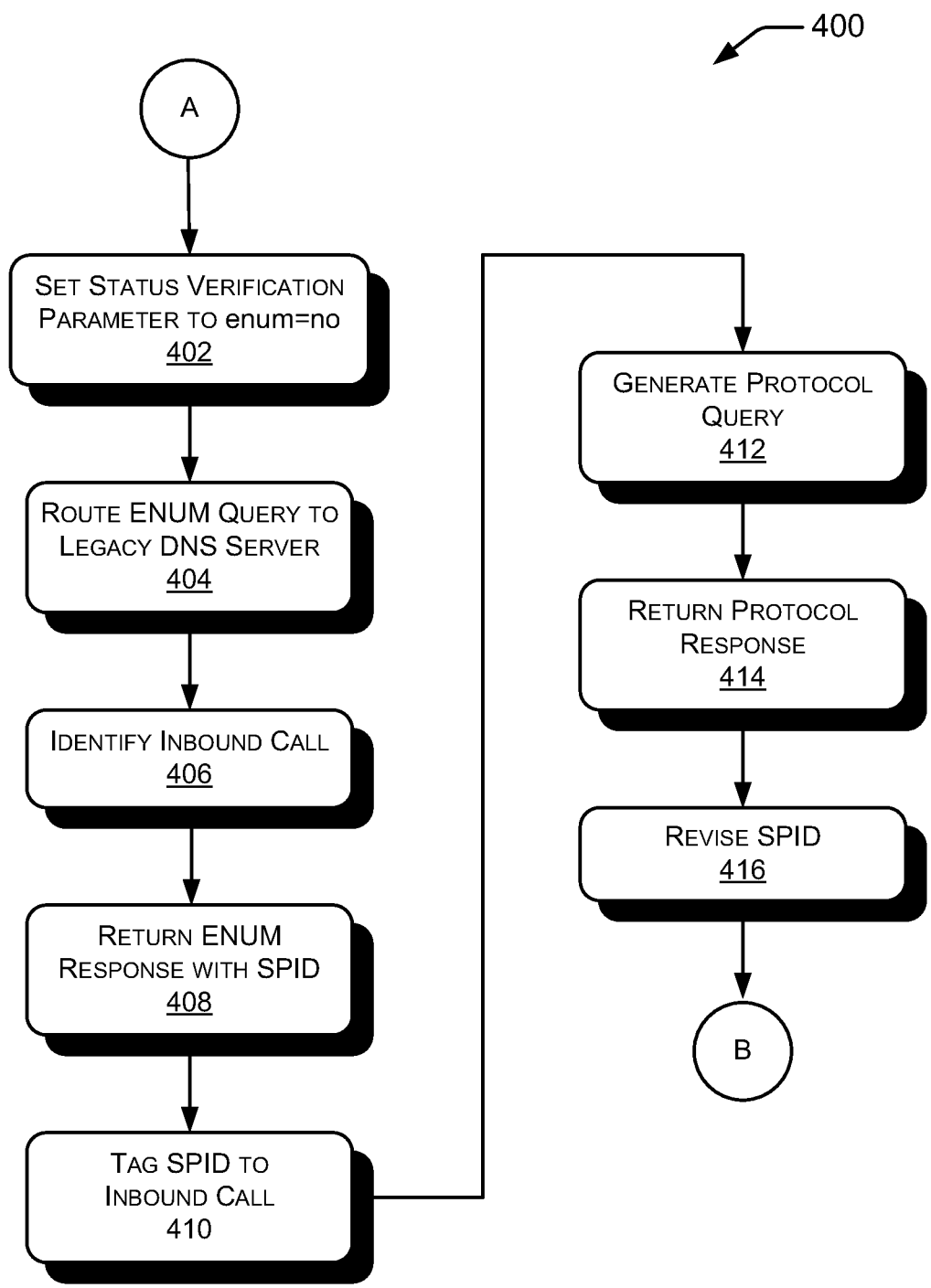
FIG. 4 illustrates the continued example process from FIG. 3.

FIG. 4 illustrates the continued example process 400 from FIG. 3.

If the I-SBC 108 determines not to route the ENUM query to the ENUM DNS Server 114 in block 308, the process continues to block 402 where the status verification parameter is set to enum=no. Based on the status verification parameter being set to enum=no, the ENUM query 112 may be routed from the BGCF 124 to the second ENUM server, the legacy ENUM server 126, in block 404. The inbound call 102 may then be identified and evaluated for a transit check based on ENUM query 112 and the second ENUM database 128 of the legacy ENUM server 126 in block 406. An ENUM response, such as the ENUM response 130 with the SPID=6529 indicating that the inbound call 102 is a normal call, may then be returned to the BGCF 124 in block 408, and the SPID may be tagged to the inbound call 102 in block 410.

The BGCF 124 may then forward the inbound call 102, and in block 412, based on the status verification parameter being set to enum=no, the TAS 138 may generate the protocol query 140, which may be a representational state transfer (REST), ENUM, or any other protocol related query. The TAS 138 may then check the protocol query 140 with the third ENUM server 142, having the third ENUM database 144, which may be maintained by a third party. The protocol query 140 may include a check for a PNB and SPAM. In block 414, the TAS 138 may receive the protocol response 146 in response to the protocol query 140 from the third ENUM server 142, and may revise the SPID based on the protocol response 146 in block 416. The inbound call 102 may then be routed according to a predefined process associated with the SPID in block 320 as discussed above.

Figure 5:
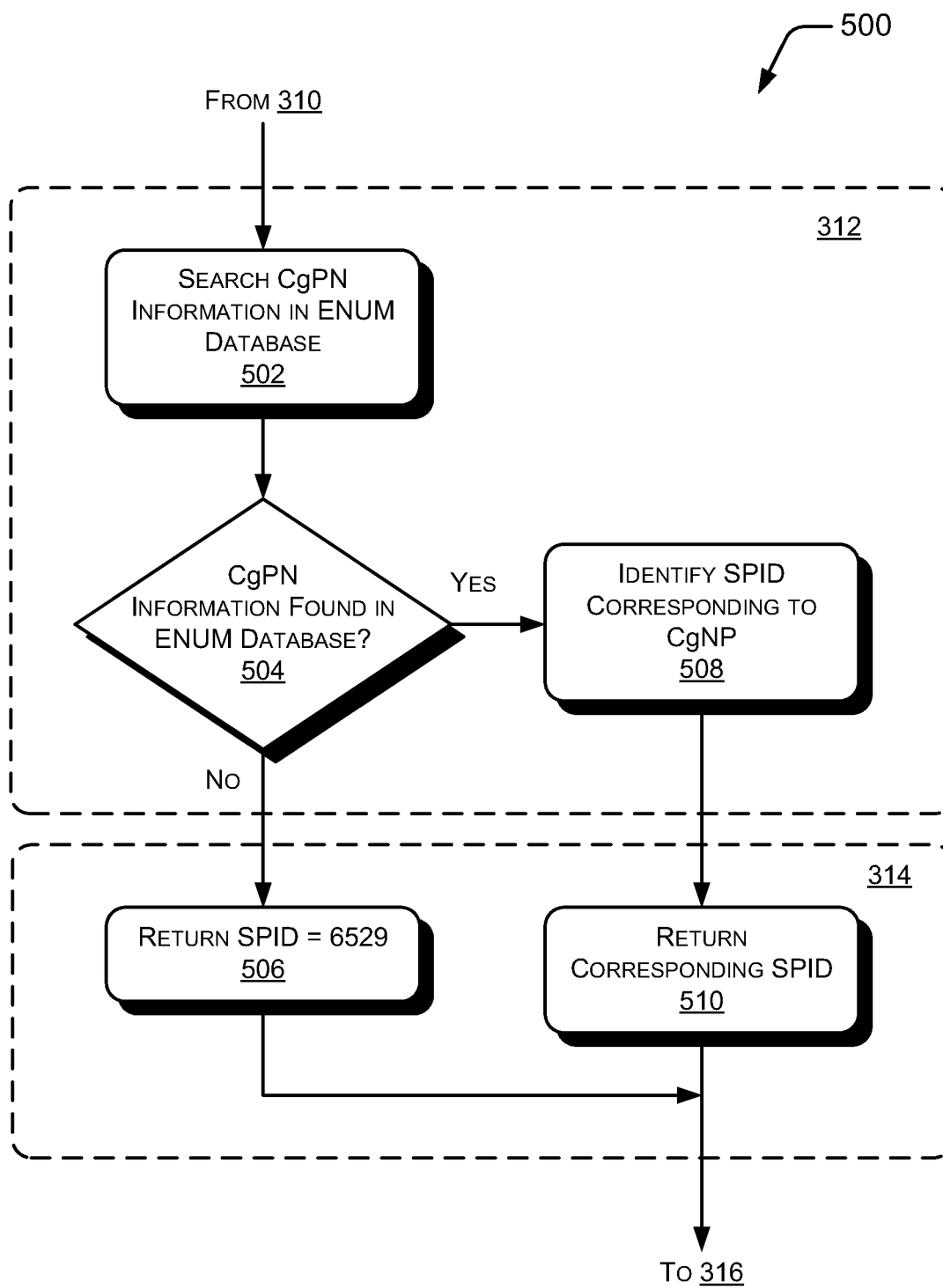
FIG. 5 illustrates an example process detailing some of the blocks of FIG. 3.

FIG. 5 illustrates an example process 500 detailing blocks 312 and 314 of FIG. 3. In block 502, the CgPN information, such as the originating phone number of the inbound call, is searched in the ENUM database 116. If the CgPN information of the inbound call is not found in the ENUM database 116 in block 504, the inbound call may be presumed to be a normal call and a corresponding SPID, such as 6529, may be returned in block 506, and the process may advance to block 316. However, if the CgPN information of the inbound call were found in the ENUM database 114 in block 504, then a fake SPID corresponding to the CgPN information, as discussed above with reference to FIG. 2, may be identified in 508. The corresponding SPID may be returned in block 510, and the process may advance to block 316.

Figure 6:
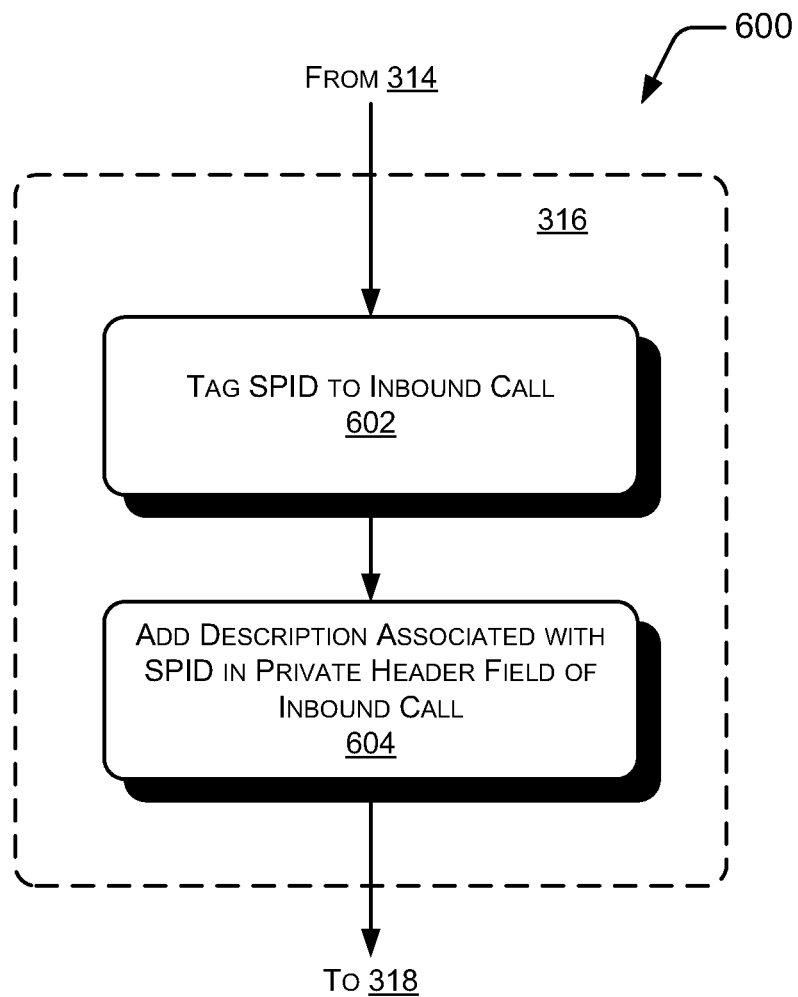
FIG. 6 illustrates an example process detailing one of the blocks of FIG. 3.

FIG. 6 illustrates an example process 600 detailing block 316 of FIG. 3. In block 602, the SPID may be tagged to the inbound call 102, and a description associated with the SPID may be added in a private header field, such as a P-Asserted-Identity (PAI), of the inbound call by utilizing the HMR in block 604. The description may be designed to be visible at the called party of the inbound call 102 and to serve as a notice or warning for the called party.

Referring back to FIG. 3, the predefined process associated with the SPID in block 320 for routing the inbound call may comprise various options or alternatives. For example, an inbound call being identified as a normal call, having the SPID of 6529 as discussed above, may be routed to the recipient identified in the inbound call without further input from the I-SBC 108. In contrast, an inbound call being identified as a known SPAM, having the SPID of 9999 as discussed above, may be blocked without being routed any further, be responded back to the calling party with a predetermined message, such as undeliverable, unavailable, or error, or be automatically sent to a voicemail.

Services associated with the disclosure above may be available by subscription to customers of a service provider offering the services. Depending on a subscription level, a subscriber may receive all incoming calls without additional information, with modified caller-ID information, or with calling party information in addition to the caller-ID. The service may be customizable such that the subscriber may be allowed to determine how a certain class of calls are routed. For example, the subscriber may desire to block all calls identified as known SPAM, and to send to voicemail all call known to be market research. The subscriber may also be able to modify his blocking and routing preferences by a phone application.

Alternatively, a database, similar to the ENUM database 114 that categorizes inbound calls into categories with associated description, may be loaded into a user device as a phone application, and be maintained by the network or a third party. The phone application may allow the user to customize how calls in a certain category may be processed at the phone.

Some or all operations of the methods described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-6. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method for routing an inbound call comprising:
    detecting an inbound call;
    generating a first query associated with the inbound call;
    adding a parameter to the inbound call;
    determining whether to route the inbound call to a first E.164 Number to URI Mapping (ENUM) server based on one of a subscription policy associated with the inbound call or a call-originating network type associated with the inbound call;
    if the inbound call is routed to the first ENUM server:
        identifying the inbound call based on the first query and a first ENUM database of the first ENUM server,
        tagging a service provider identification (SPID) of a first value to the inbound call based on the identification of the inbound call, and
        setting the parameter to a first status;
    if the inbound call is not routed to the first ENUM server:
        setting the parameter to a second status,
        routing the inbound call to a second ENUM server,
        identifying the inbound call based on the first query and a second ENUM database of the second ENUM server, and
        tagging an SPID of a second value to the inbound call based on the identification of the inbound call; and
    routing the inbound call based on the SPID.

2. A method of claim 1, wherein routing the inbound call based on the SPID comprises:
    refraining from routing the inbound call to a called party of the inbound call based on the SPID of the inbound call; and sending, to a calling party of the inbound call, a response indicative of the called party being unavailable.

3. A method of claim 1, wherein the first query associated with the inbound call is based on the subscription policy associated with the inbound call and comprises at least one of:
   a called party number (CdPN) query,
   a calling party number (CgPN) query associated with the inbound call, or
   a concatenated query of the CdPN query and the CgPN query associated with the inbound call.

4. A method of claim 3, wherein identifying the inbound call based on the first query and the first ENUM database comprises:
   looking up E.164 information of the inbound call in the first ENUM database based on the CgPN query;
   identifying at least one of the E.164 information or a personal number block (PNB) as one of listings in a particular classification of a plurality of predefined classifications; and
   returning a SPID associated with the particular classification as the first value.

5. A method of claim 3, wherein identifying the inbound call based on the first query and the second ENUM database comprises:
   looking up E.164 information of the inbound call in the second ENUM database based on the CdPN query;
   identifying the E.164 information as one of listings in a transit classification; and
   returning a SPID associated with the transit classification as the second value.

6. A method of claim 5, further comprising:
   generating a second query associated with the inbound call;
   routing the inbound call to a third ENUM server;
   performing a personal number block (PNB) check and scam check based on the second query against a third ENUM database of the third ENUM server; and
   returning an SPID based on with the PNB check, the scam check, and the second value.

7. A method of claim 1,
   wherein tagging the SPID to the inbound call based on the identification of the inbound call further comprises adding a predetermined description associated with the SPID in a private header field of the inbound call, and
   wherein routing the inbound call based on the SPID comprises routing the inbound call to a called party of the inbound call having the predetermined description being visible at the called party.

8. A method of claim 7, wherein adding the predetermined description associated with the SPID in the private header field of the inbound call by utilizing a header modification rule (HMR).

9. A method of claim 1, wherein the parameter is added to a request uniform resource identifier (R-URI) in a session initiation protocol (SIP) INVITE header field of the inbound call.

10. A non-transitory computer storage medium storing computer-readable instructions executable by a computer, that when executed by the computer, cause the computer to perform operations comprising:
    detecting an inbound call;
    generating a first query associated with the inbound call;
    adding a parameter to the inbound call;
    determining whether to route the inbound call to a first E.164 Number to URI Mapping (ENUM) server based on one of a subscription policy associated with the inbound call or a call-originating network type associated with the inbound call;
    if the inbound call is routed to the first ENUM server:
       identifying the inbound call based on the first query and a first ENUM database of the first ENUM server,
       tagging a service provider identification (SPID) of a first value to the inbound call based on the identification of the inbound call, and
       setting the parameter to a first status;
    if the inbound call is not routed to the first ENUM server:
       setting the parameter to a second status,
       routing the inbound call to a second ENUM server,
       identifying the inbound call based on the first query and a second ENUM database of the second ENUM server,
       tagging an SPID of a second value to the inbound call based on the identification of the inbound call; and
       routing the inbound call based on the SPID.

11. A non-transitory computer storage medium of claim 10, wherein routing the inbound call based on the SPID comprises:
    refraining from routing the inbound call to a called party of the inbound call based on the SPID of the inbound call; and
    sending, to a calling party of the inbound call, a response indicative of the called party being unavailable.

12. A non-transitory computer storage medium of claim 10, wherein the first query associated with the inbound call is based on the subscription policy associated with the inbound call and comprises at least one of:
    a called party number (CdPN) query,
    a calling party number (CgPN) query associated with the inbound call, or
    a concatenated query of the CdPN query and the CgPN query associated with the inbound call.

13. A non-transitory computer storage medium of claim 12, wherein identifying the inbound call based on the first query and the first ENUM database comprises:
    looking up E.164 information of the inbound call in the first ENUM database based on the CgPN query;
    identifying at least one of the E.164 information or a personal number block (PNB) as one of listings in a particular classification of a plurality of predefined classifications; and
    returning a SPID associated with the particular classification as the first value.

14. A non-transitory computer storage medium of claim 12, wherein identifying the inbound call based on the first query and the second ENUM database comprises:
    looking up E.164 information of the inbound call in the second ENUM database based on the CdPN query;
    identifying the E.164 information as one of listings in a transit classification; and
    returning a SPID associated with the transit classification as the second value.

15. A non-transitory computer storage medium of claim 14, further comprising:
    generating a second query associated with the inbound call;
    routing the inbound call to a third ENUM server;
    performing a personal number block (PNB) check and scam check based on the second query; and
    returning an SPID based on with the PNB check, the scam check, and the second value.

16. A non-transitory computer storage medium of claim 10,
wherein tagging the SPID to the inbound call based on the identification of the inbound call further comprises adding a predetermined description associated with the SPID in a private header field of the inbound call, and
wherein routing the inbound call based on the SPID comprises routing the inbound call to a called party of the inbound call having the predetermined description being visible at the called party.

17. A non-transitory computer storage medium of claim 16, wherein adding the predetermined description associated with the SPID in the private header field of the inbound call by utilizing a header modification rule (HMR).

18. A non-transitory computer storage medium of claim 10, wherein the parameter is added to a request uniform resource identifier (R-URI) in a session initiation protocol (SIP) INVITE header field of the inbound call.

19. A system configured to route an inbound call, the system comprising:
a first E.164 Number to URI Mapping (ENUM) server, the ENUM server including a first ENUM database, the first ENUM database comprising:
personal number block (PNB) information and a plurality of predefined classifications, each of the plurality of predefined classification having a corresponding service provider identification (SPID) and having a list of associated E.164 information, and
an interconnect session border controller (I-SBC) communicatively coupled to the first ENUM database, the I-SBC configured to:
detect an inbound call,
generate a first query associated with the inbound call upon detecting the inbound call,
add a parameter to the inbound call,
determine whether to route the inbound call to the first ENUM server based on one of a subscription policy associated with the inbound call or a call-originating network type associated with the inbound call,
if the inbound call is routed to the first ENUM server:
identify the inbound call based on the first query and the first ENUM database of the first ENUM server,
tag a service provider identification (SPID) of a first value to the inbound call based on the identification of the inbound call, and
setting the parameter to a first status,
if the inbound call is not routed to the first ENUM server:
set the parameter to a second status, and
route the inbound call based on the SPID.

20. A system of claim 19, further comprising:
a border gateway control function (BGCF) module communicatively coupled to the I-SBC, the BGCF module configured to, for the inbound call having the parameter set to the second status:
route the inbound call to a second ENUM server coupled to the BGCF module for a transit check,
identify the inbound call based on the first query and a second ENUM database of the second ENUM server, and
tag an SPID of a second value to the inbound call based on the identification of the inbound call, and
a telephony application server (TAS) communicatively coupled to the BGCF module, the TAS configured to:
receive the inbound call forwarded by the BGCF module,
generate a second query associated with the inbound call;
route the inbound call to a third ENUM server coupled to the TAS;
perform a personal number block (PNB) check and scam check based on the second query against a third ENUM database of the third ENUM server; and
returning an SPID based on with the PNB check, the scam check, and the second value.

* * * * *